March 23, 1948.  T. J. SMULSKI  2,438,305
WINDSHIELD WIPER ARM
Filed Jan. 16, 1942
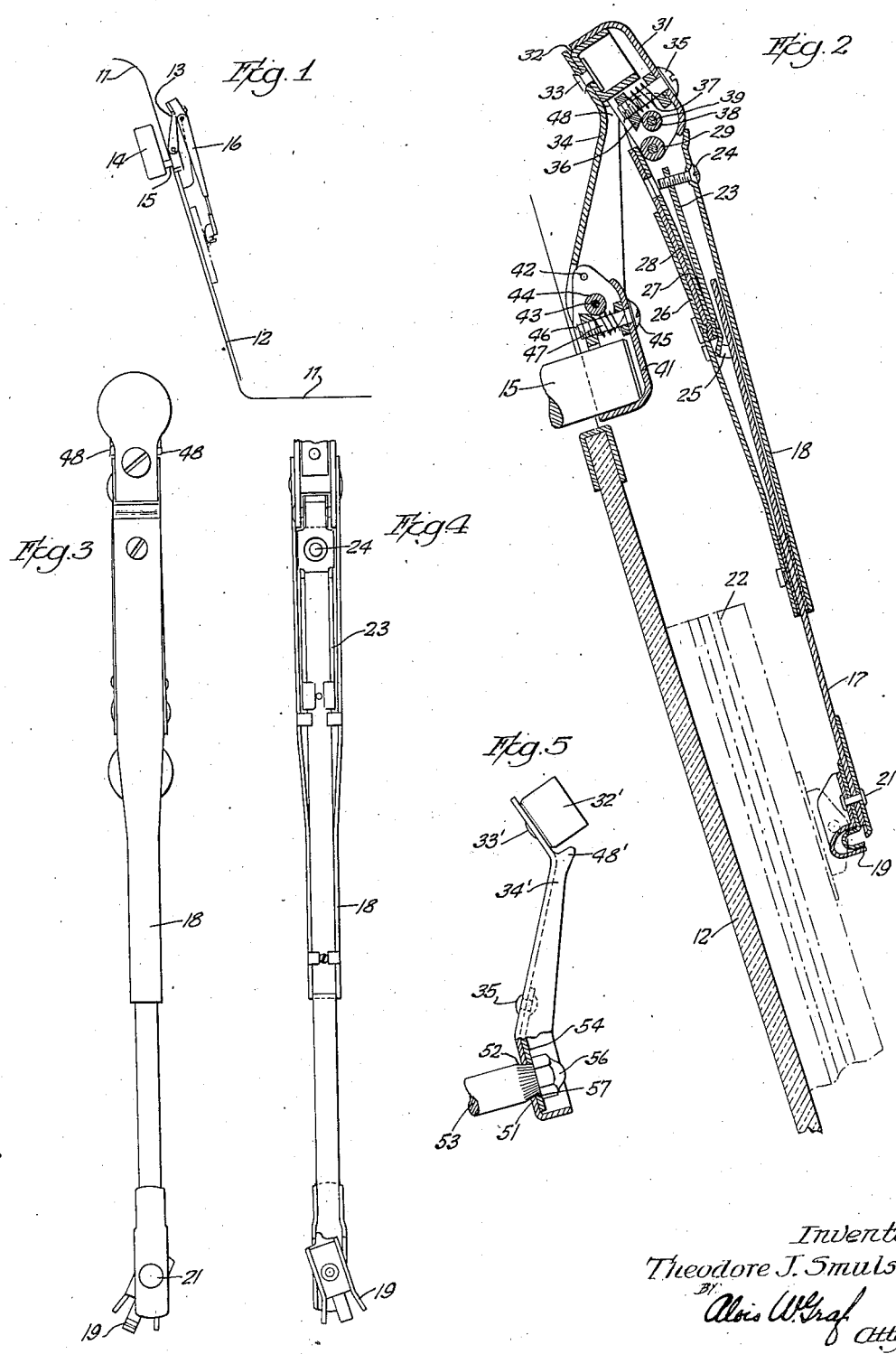
Inventor
Theodore J. Smulski Patented Mar. 23, 1948

2,438,305

UNITED STATES PATENT OFFICE 2,438,305

WINDSHIELD WIPER ARM

Theodore J. Smulski, Gary, Ind., assignor to Productive Inventions, Inc., a corporation of Indiana Application January 16, 1942, Serial No. 426,936

17 Claims. (Cl. 15—255)

My invention relates to windshield wiper arms, and more particularly to multi-section windshield wiper arms for use with the actuating shaft of a windshield wiper mechanism with a windshield which opens outwardly.

At present there is being manufactured a commercial automotive vehicle or truck which has a windshield which opens outwardly from the vehicle cab. This windshield is pivotally mounted on hinges or hangers so that the pivotal axes of the hangers and the windshield are a considerable distance above the upper edge of the windshield frame. It has been found to be necessary to mount the windshield wiper motor or mechanism so that the actuating shaft thereof is located between the pivotal axis of the windshield and the upper edge of the windshield frame. It therefore is necessary to provide a windshield wiper arm which has a pivotal axis in the same general vicinity as the pivotal axis of the windshield. Windshield wiper arms as commonly used on motor vehicles at the present time are of the multi-section type mounted on and secured to the actuating shaft of a windshield wiper mechanism. The inner section pivotally supports the remaining or outer sections of the wiper arm. This pivotal connection in present arms however is relatively close to the means by which the inner section is attached to the actuating shaft of a wiper mechanism. Obviously in order to provide a windshield wiper arm for a motor vehicle having a windshield structure such as was previously described it will be necessary to provide a pivot point for the arm at some distance from the windshield wiper actuating shaft. For economy in manufacture which involves the cost of parts, the cost of dies and the cost of inventory as well as the additional costs incurred by different assembly procedure, it is highly desirable in the manufacture of an arm for a vehicle of the type above described to utilize as much as possible standard windshield wiper arms, dies and parts. From the standpoint of facilitating replacement of worn or defective arms with a minimum of inventory stock, it furthermore is desirable to use wherever possible arm structure which already is available.

It therefore is an object of my invention to provide a new and improved windshield wiper arm which will entail a minimum of cost in manufacture and in inventory for both the manufacturer and the service station.

Still another object of my invention is to provide a new and improved inner arm section for use with the outer arm sections of commercially available windshield wiper arms.

Other and further objects of my invention will become readily apparent by reference to the following description taken in connection with the accompanying drawings in which—

Figure 1 shows the relation between the windshield of the vehicle, the wiper motor and actuating shaft, and the windshield wiper arm embodying my invention;

Figure 2 is an enlarged view in section of the windshield and the windshield wiper arm;

Figure 3 is a front view of the arm;

Figure 4 is a partial view of the back of the outer portion of the arm, and

Figure 5 is a modification of the inner section suitable for attachment to a different type of windshield wiper actuating shaft.

Referring to Figures 1 to 4 of the drawing I have shown therein the outline 11 of the cab and vehicle hood which is provided with a windshield 12 pivotally mounted at 13 by suitable hinges. A windshield wiper mechanism 14 is mounted so that the actuating shaft 15 thereof is located between the upper edge of the frame of the windshield 12 and pivotal axis 13 of the windshield. The windshield wiper arm 16 is attached to the actuating shaft 15 so that the shaft is at an intermediate point between ends of the wiper arm 16. The windshield wiper arm 16 comprises an outer section 17 mounted on and longitudinally adjustable with respect to an intermediate section 18 which is of channel formation provided adjacent one end with a tapered portion to form a guide for the outer section. The outer section 17 at its free end is provided with a pivotally mounted windshield wiper blade attachment means 19. The blade attachment means 19 is pivotally mounted at 21 by a suitable means such as a rivet so that a windshield wiper blade 22 may be angularly positioned to one side or the other of the outer section 17 thereby to permit the blade to be aligned with the frame of the windshield 13 when the arm is in the parked position. This attachment means does not form any part of my invention, but is the invention of John W. Anderson which is described and claimed in an application for United States Letters Patent, Serial No. 282,008, filed June 30, 1939, for a Windshield wiper arm (now Patent No. 2,290,140), and which is assigned to the same assignee as the present application.

The intermediate section 18 is provided with a spring assembly comprising a retainer member 23 provided at one end with a threaded aperture in which there is mounted a screw 24 which extends through an aperture in the base of the channel portion of the intermediate section 18. The assembly member 23 is furthermore provided with a pair of rocker portions 25 which engage the underside of the top portion of the channel-like body of the intermediate section 18. The retainer member 23 has a channel-like configuration so as to receive a plurality of spring members 26, 27 and 28, the latter two being provided with suitable apertures through which the lower extremity of the screw 24 may extend without interfering with the operation of the wiper arm. The one extremity of the spring 28 which is reinforced throughout its entire length by the spring 27 engages the contact member 29 of a wiper arm section 31. This wiper arm section 31 corresponds to what is generally the inner section of a conventional multi-section wiper arm, which section is generally attached to the actuating member of a windshield wiper mechanism. In the present arrangement, however, this section no longer serves for this purpose, but is secured to a male type attaching means comprising a cap or stud member 32 which by means of a rivet 33 or other suitable means is secured to an elongated arm section 34. The arm section 31 is secured to the cap or stud 32 of the arm section 34 by a screw 35 which is accessible from the top of the section 31 and which supports a wedge member 36. The wedge member 36 is held in position relative to the section 31 by a spring 37. The wedge member 36 is preferably provided with a concave surface, which may be serrated, which engages the cap or stud 32 of the section 34; and on the opposite side of the wedge 36 there is a smooth angularly positioned surface which engages a sleeve 38 surrounding the pivot pin 39 which pivotally secures the intermediate section 18 to the section 31.

In order to utilize standard parts as much as possible, the other end of the section 34 has secured thereto a female type attaching means comprising a cap-like member 41 which is of the same configuration as the section 31. The cap 41 is held in position on the section 34 by means of a rivet 42 and a second rivet 43 which latter rivet is surrounded by a sleeve 44. The cap portion 41 is provided with a screw 45 which engages a wedge member 46 held in operative position by means of a spring 47. The operation of the bearing sleeve 44, the screw 45, the wedge member 46 and the spring 47 corresponds to the operation of the sleeve 38, the screw 35, the wedge 36 and the spring 37 of the section 31. The section 34 adjacent the stud or cap 32 is provided with a pair of upwardly extending ear-like portions 48 which engage the sides of the section 31 so as to further insure that there will be no relative rotational movement between the arm section 31 and the arm section 34.

The assembly thus described forms a wiper arm composed of two portions, the first section 34 and the second section 31 constituting an inner supporting arm portion attached to the actuating shaft 15 of a windshield wiper mechanism and the third or intermediate section 18 together with the fourth or outer section 17 constituting an outer supported arm portion which extends in a direction opposite to the channel portion of the inner arm section 34 and which is pivotally biased about the inner section in a direction toward the channel member of the inner section and toward the windshield surface. The first section 34 of the arm is attached to the actuating shaft 15 of the windshield wiper mechanism so as to be opposite a point intermediate the ends of the outer portion of the windshield wiper arm. As has been previously pointed out, it is highly desirable to provide an arrangement utilizing arm sections and parts which already are commercially available. Furthermore, if the inventory of a service station fails to show sufficient conventional multi-section wiper arms on hand, the assembly shown in Figure 2 may be taken apart so that the arm sections 17, 18, and 31 may be used as a conventional wiper arm.

In Figure 5 there is shown a modification 34' of the arm section 34, the one extremity of which is provided with an extended portion having female type fastening means comprising a circular aperture 51 which is arranged to engage the conical serrated portion 52 of a windshield wiper actuating shaft 53. Adjacent the inner channel surface of the section 34' there is provided a reinforcing member 54 secured to the channel by a rivet 55. This reinforcing member 54 is preferably provided with an aperture 56 which is serrated, and the member 54 is also preferably of harder metal than the channel section 34'. The arm section is secured to the wiper shaft 53 by means of a cap nut 56 which forces the surface of the apertures 51 and 56 into engagement with the conical serrated wiper shaft portion 52 so that irrespective of the degree of hardness of the conical portion 52 of the wiper shaft, the arm section 34 will be positively locked thereto so as to preclude any rotation of this arm section relative to the shaft 53. From the above it will be seen that the arm section 34 of Figure 2 and the arm section 34¹ of Figure 5 each comprises an elongated section provided adjacent one end thereof with a female type fastening means and at the other end thereof with a male type fastening means. These fastening means are spaced a substantial distance apart and in different planes.

While I have shown a particular embodiment of my invention, it is to be understood that it is not to be limited thereto since it is apparent that the principles herein disclosed are susceptible of modification without departing from the spirit and scope of my invention as set forth in the appended claims.

What I claim as new and desire to secure by Letters Patent of the United States is:

1. A windshield wiper arm section comprising a channel member having at one end thereof at an angle to the base of said channel, means for engaging the conical serrated portion of an actuating shaft of a windshield wiper mechanism, said means comprising a circular aperture in an extended portion of the base of said channel, and an element of greater hardness than said channel mounted adjacent said extended portion of said channel and having a serrated circular aperture positioned concentric to the circular aperture in said extended base portion of said channel; a cylindrical stud member mounted at an angle to the base of said channel at the other end thereof for engaging the attaching section of a multi-section wiper arm, and means extending from said channel sides to engage the outer sides of said attaching section.

2. A windshield wiper arm section comprising a channel member having at one end thereof at an angle to the base of said channel, attachment means for securing said section to the actuating shaft of a windshield wiper mechanism, said means comprising a cap-like portion having a screw member mounted thereon, a wedge member actuated by said screw member, a bearing member attached to said portion and adapted to bear upon a portion of said wedge member, another portion of said wedge member being adapted to engage said actuating shaft as said wedge member is moved into wedging position between said bearing member and said shaft member by actuation of said screw; and a cylindrical stud member mounted at an angle to the base of said channel at the other end thereof for engaging the attaching section of a multi-section wiper arm, and means extending from said channel sides for engaging the outside of said attaching section.

3. A windshield wiper arm section comprising a longitudinal member provided with female type fastening means adjacent one end thereof adapted to engage the actuating shaft of a windshield wiper mechanism for securely attaching said member to said actuating shaft, and a male type member carried by the other end of said member to which the inner section of a multi-section wiper arm may be attached.

4. A windshield wiper arm section adapted for use with a multi-section arm, said section being provided adjacent one end thereof with a cylindrical member to which the inner section of said multi-section wiper arm is to be attached, and fastening means adjacent the other end of said section for attaching said section to the actuating member of a windshield wiper mechanism.

5. A windshield wiper arm section comprising a longitudinal member provided adjacent one end thereof with a stud member to which the inner section of a multi-section wiper arm may be attached, said member having an extended portion adapted to engage said inner section, and fastening means adjacent the other end of said section for attachment to the actuating shaft of a windshield wiper mechanism.

6. A windshield wiper arm section comprising a longitudinal member having at one end thereof at an angle to the longitudinal axis of said member attachment means for securing said section to the actuating shaft of a windshield wiper mechanism, a cylindrical stud member mounted at an angle to the longitudinal axis of said member at the other end thereof for engaging the attaching means of a windshield wiper arm, and means extending at an angle to the longitudinal axis of said longitudinal member for engaging the outside of said attaching means.

7. A windshield wiper arm section comprising an elongated member provided adjacent one end thereof with female type means adapted to engage securely the driving shaft of a windshield wiper actuating mechanism, said member being provided adjacent its other end with male type means for engaging in securing relation a detachable windshield wiper arm head of a design substantially similar to said female means.

8. A multi-section windshield wiper arm assembly comprising a first section adapted for attachment to an actuating member of a windshield wiper mechanism, a readily detachable second section adapted for attachment to said first section, a third section pivoted to said second section, said first section being provided adjacent one end thereof with a male member to which the readily detachable second section is securely attached, and fastening means adjacent the other end of said first section for attaching said first section securely to the actuating member of a windshield wiper mechanism.

9. A cleaner for hingedly suspended windshields, comprising a drive shaft for mounting in the header above the windshield, an upwardly extending offsetting arm fixed on the shaft, and a wiper arm carried by the upper end of the offsetting arm and including a wiper carrying part pivoted thereon above the shaft for swinging from such offset point during swinging adjustment of the windshield, such wiper carrying part extending across the shaft axis.

10. A windshield cleaner adapted for mounting in a support adjacent a windshield, comprising a drive shaft, an offsetting member fixed to the shaft and extending radially therefrom away from the windshield, the outer end of the offsetting member having an arm engaging head and a wiper arm having a mounting section with a socket receiving such head and a wiper carrying section pivotally connected to the mounting section above the drive shaft and extending across the axis of the latter for actuating a wiper in an arcuate path about the axis.

11. A windshield cleaner adapted for mounting in the header above a hinged windshield, comprising a drive shaft, an offsetting member affixed to the shaft and extending radially therefrom in a direction away from the windshield, the outer end of the offsetting member having an arm engaging head, and a wiper arm having a mounting section with a socket receiving such head and a wiper carrying section pivotally connected to the mounting section at a point disposed outwardly from the drive shaft and extending across the axis of the latter for actuating a wiper in an arcuate path about the axis.

12. A windshield cleaner mechanism adapted for mounting upon a drive shaft adjacent the pivot of a hinged windshield comprising, in combination, an offsetting member adapted to be affixed to the shaft and to extend radially therefrom in a direction away from the windshield, the outer end of the offsetting member having an arm engaging head, and a wiper arm having a mounting section with a socket receiving such head and a wiper carrying section pivotally connected to the mounting section at a point disposed outwardly from the drive shaft engaging portion of the offsetting member, and extending inwardly toward the windshield beyond the drive shaft engaging portion of the offsetting member for actuating the wiper in an arcuate path about the drive shaft axis.

13. A windshield wiper arm offsetting carrier comprising a longitudinal member and including a fixed stud adjacent one end thereof to which the inner section of a multi-section wiper arm may be attached, said carrier having surface portions constructed and arranged for interfitting engagement with said inner section for positively preventing rotation of the inner section relative to the carrier, and fastening means adjacent the other end of said carrier for attachment to the actuating shaft of a windshield wiper mechanism.

14. A windshield wiper arm section comprising a channel member having at one end thereof at an angle to the base of said channel, means for engaging the conical serrated portion of an actuating shaft of a windshield wiper mechanism, said means comprising a circular aperture in an extended portion of the base of said channel, and an element of greater hardness than said channel mounted adjacent said extended portion of said channel and having a serrated circular aperture positioned concentric to the circular aperture in said extended base portion of said channel; a stud mounted at an angle to the base of said channel at the other end thereof for engaging the attaching member of a multi-section wiper arm, and means extending from one of said members engaging the other member assisting to prevent relative movement between said members.

15. A windshield wiper arm section comprising a member having a stud adjacent one end thereof, a multi-section wiper arm provided with a socket receiving said stud, abutment means associated with said socket, a wedge, a screw for moving said wedge between said abutment means and the stud for securing said socket to said stud, and means adjacent the other end of said member for engaging an actuating shaft.

16. A windshield wiper arm section comprising a member having a stud adjacent one end thereof, a multi-section wiper arm provided with a socket member receiving said stud, abutment means associated with said socket member, a wedge, a screw for moving the wedge between said abutment means and the stud for securing the socket to said stud, means extending from one of said members assisting to limit relative movement between said members, and means adjacent the other end of said first mentioned member for engaging an actuating shaft.

17. A windshield wiper arm structure comprising a first arm section, a second arm section provided adjacent one extremity of said first section for connecting the arm structure to a drive shaft, a third arm section provided adjacent the other extremity of said first section, a fourth arm section pivotally connected to said third section, and a fifth arm section having one extremity secured to said fourth section and its other extremity provided with means to which a wiper or cleaner may be attached.

THEODORE J. SMULSKI.

REFERENCES CITED

The following references are of record in the file of this patent:

UNITED STATES PATENTS

| Number | Name | Date |
| --- | --- | --- |
| 2,144,454 | Folberth et al. | Jan. 17, 1939 |
| 2,229,718 | Bramming | Jan. 28, 1941 |

FOREIGN PATENTS

| Number | Country | Date |
| --- | --- | --- |
| 255,658 | Great Britain | July 29, 1926 |